(12) United States Patent
Suzuki et al.

(10) Patent No.: US 7,769,264 B2
(45) Date of Patent: Aug. 3, 2010

(54) OPTICAL WAVEGUIDE WITH POSITION RECOGNITION MARK AND METHOD FOR PRODUCING THE SAME

(75) Inventors: Toshihiko Suzuki, Kanagawa (JP); Keishi Shimizu, Kanagawa (JP); Akira Fujii, Kanagawa (JP); Kazutoshi Yatsuda, Kanagawa (JP); Masahiro Igusa, Kanagawa (JP); Shigemi Ohtsu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 2 days.

(21) Appl. No.: 12/364,106

(22) Filed: Feb. 2, 2009

(65) Prior Publication Data
US 2010/0040337 A1    Feb. 18, 2010

(30) Foreign Application Priority Data
Aug. 15, 2008   (JP)   ............................. 2008-209212

(51) Int. Cl.
G02B 6/02  (2006.01)
G02B 6/10  (2006.01)

(52) U.S. Cl. .................... 385/129; 385/130; 385/131; 385/132; 427/163.2

(58) Field of Classification Search ......... 385/129–132; 427/163.2
See application file for complete search history.

(56) References Cited

U.S. PATENT DOCUMENTS

2002/0018633 A1* 2/2002 Imaizumi .................... 385/132
2007/0025672 A1* 2/2007 Suzuki et al. ................ 385/129
2007/0140632 A1* 6/2007 Sasaki et al. ................ 385/114

FOREIGN PATENT DOCUMENTS

JP    A-8-286064    11/1996

* cited by examiner

Primary Examiner—Charlie Peng
Assistant Examiner—Jerry Blevins
(74) Attorney, Agent, or Firm—Oliff & Berridge, PLC (57) ABSTRACT

An optical waveguide includes: a core portion through which light propagates; a cladding portion enclosing the core portion along a direction of light propagation, and a colored resin for position recognition marking, the optical waveguide having substantially planar outer surfaces including principal surfaces thereof, and the colored resin being embedded in the optical waveguide at a position that does not substantially overlap the core portion when viewed from a direction perpendicular to a principal surface of the optical waveguide and does not substantially contact the core portion.

9 Claims, 7 Drawing Sheets

OPTICAL WAVEGUIDE WITH POSITION RECOGNITION MARK AND METHOD FOR PRODUCING THE SAME

CROSS-REFERENCE TO RELATED APPLICATION

This application is based on and claims priority under 35 USC 119 from Japanese Patent Application No. 2008-209212 filed on Aug. 15, 2008.

BACKGROUND

1. Technical Field

The present invention relates to an optical waveguide and a method for producing the same.

2. Related Art

Optical waveguides are used in optical interconnections in which signal transmission within or between information devices is conducted by light. An example of application of a polymer optical waveguide to optical wiring within or between such devices is a multimode optical waveguide having a simple structure in which linear cores are disposed at a desired pitch.

Optical coupling between such an optical waveguide and an optical element such as a light receiving/emitting element requires high alignment accuracy. Examples of methods for achieving optical coupling include active alignment, passive alignment, and self alignment. In active alignment, alignment is performed by driving the optical element and monitoring the intensity of the optical input. In the passive alignment, alignment is performed using a high precision multi-axis stage by reference to a position recognition mark provided at the optical element. In self alignment, alignment is performed by butting or fitting an optical element and an optical waveguide to each other, the optical waveguide having an outer shape formed with high precision. Among these methods for achieving optical coupling, passive alignment and self alignment are advantageous in terms of reducing cost and are suitable as techniques for forming optical wiring within or between devices that are required to be economically efficient.

SUMMARY

According to an aspect of the present invention, there is provided an optical waveguide including:

a core portion through which light propagates;

a cladding portion enclosing the core portion along a direction of light propagation, and a colored resin for position recognition marking, the optical waveguide having substantially planar outer surfaces including principal surfaces thereof, and the colored resin being embedded in the optical waveguide at a position that does not substantially overlap the core portion when viewed from a direction perpendicular to a principal surface of the optical waveguide and does not substantially contact the core portion.

BRIEF DESCRIPTION OF THE DRAWINGS

Exemplary embodiments of the present invention will be described in detail based on the following figures, wherein.

DETAILED DESCRIPTION

In the following, exemplary embodiments of the present invention are described with reference to the drawings. Throughout the drawings, elements having substantially the same function and action are designated by the same reference character or the reference character is omitted, and duplicated descriptions are omitted as appropriate.

Figure 1:
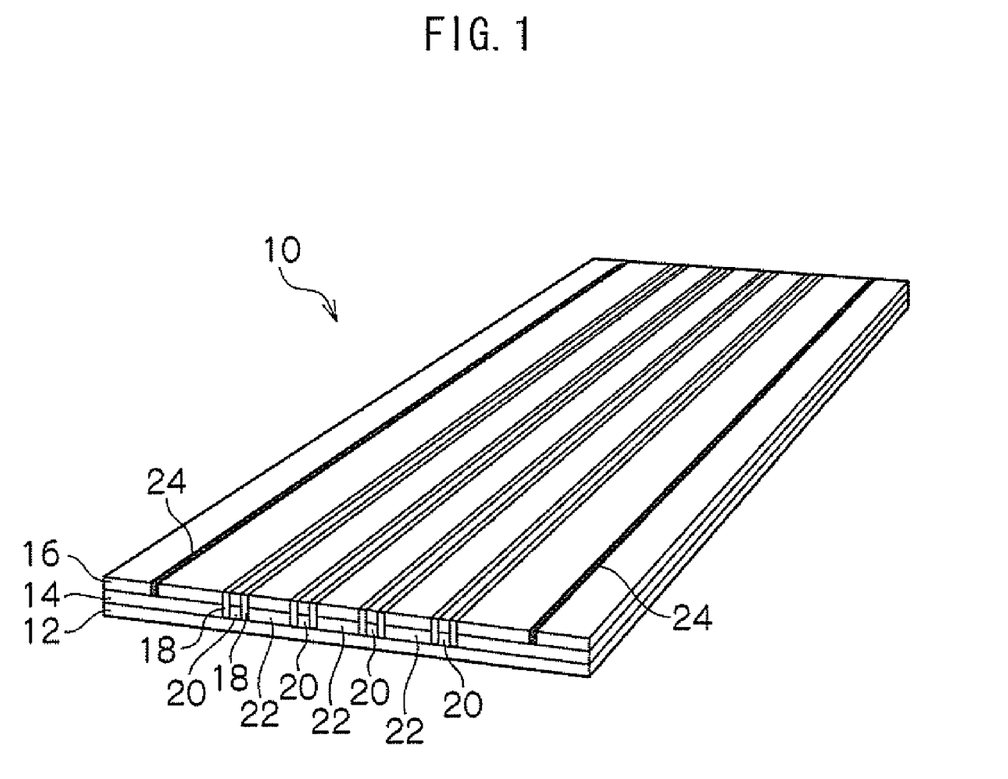
FIG. 1 is a perspective view schematically showing an optical waveguide according to a first exemplary embodiment.
Figure 2:
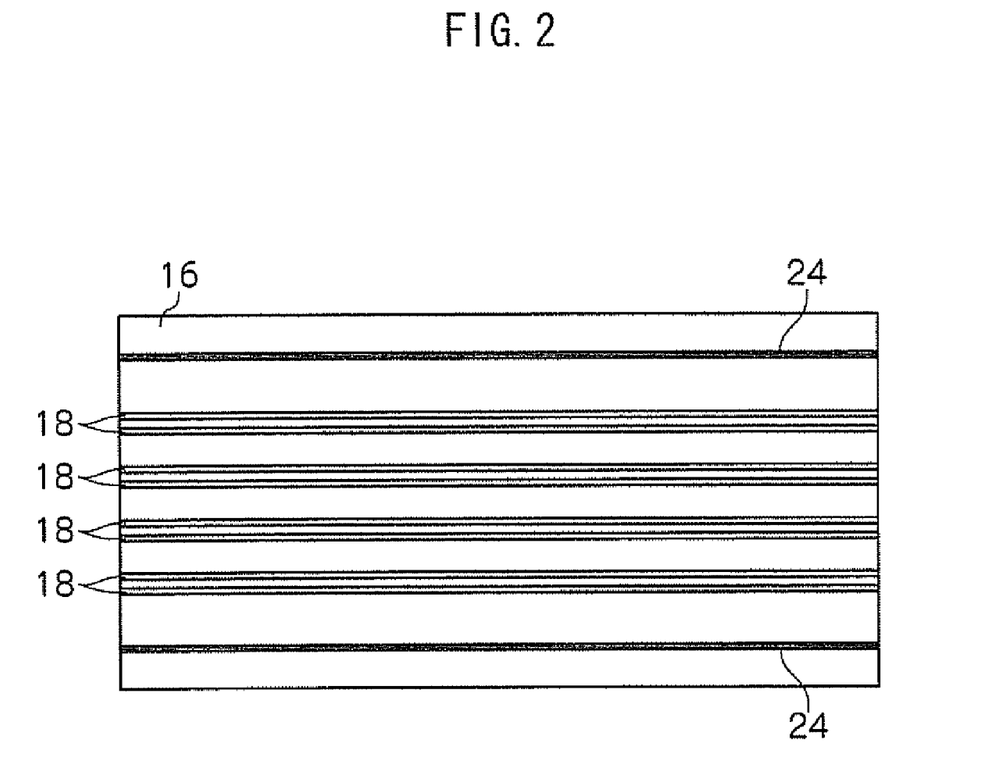
FIG. 2 is a plan view schematically showing the optical waveguide according to the first exemplary embodiment.

FIG. 1 is a perspective view showing an optical waveguide film according to the first exemplary embodiment, and FIG. 2 is a plan view showing the optical waveguide film according to the first exemplary embodiment.

Optical waveguide 10 has a film shape (or is shaped like a sheet) and has core portions 20 through which light propagates and cladding portions 12, 16, and 18 enclosing core portions 20 and extending along the direction of the light propagation. Colored resin 24 for position recognition marking, which serves as a position recognition mark, is embedded at positions that do not overlap core portions 20 when viewed from a direction perpendicular to a principal surface of optical waveguide 10. Position recognition marks 24 are provided in a linear shape near the side surfaces of optical waveguide 10 such that position recognition marks 24 are parallel to, and do not contact, cores portions 20. Position recognition marks (lines) 24 serve as a basis for locating core portions 20 in the direction of the width of optical waveguide 10 and/or for performing rotational correction in the axial direction perpendicular to the principal surface.

The term "principal surface" used herein refers to a surface of optical waveguide 10 that is perpendicular to the direction in which core portions 20 and cladding portions (cladding portion 12 and cladding portions 16) disposed to sandwich core portions 20 are layered (i.e., the thickness direction of optical waveguide 10). In other words, optical waveguide 10 has a substantially planar appearance having an upper surface and a lower surface, and the upper and lower surfaces are each referred to as a "principal surface" of the optical waveguide.

FIGS. 3A to 3E show an example of steps in a method for producing optical waveguide 10 according to the first exemplary embodiment.

Figure 3A:
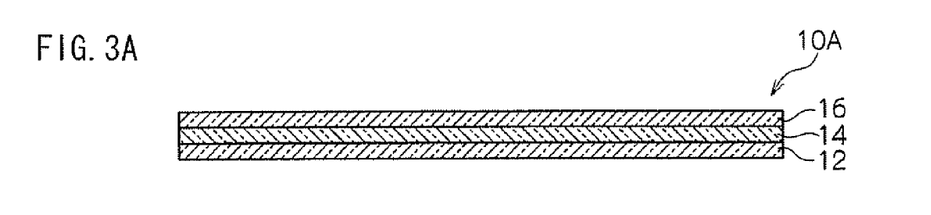
FIGS. 3A to 3E are diagrams showing steps in the production of an optical waveguide according to the first exemplary embodiment.

In the method for producing optical waveguide 10 according to the first exemplary embodiment, polymer film (optical waveguide film) 10A is first prepared which is a layered material having cladding layers 12 and 16 and core layer 14 as shown in FIG. 3A. Lower cladding layer (or first cladding) 12, core layer 14, and upper cladding layer (or second cladding) 16 are disposed in this order in polymer film 10A.

Polymer film 10A is produced, for example, by sequentially layering sheets corresponding the respective layers using a lamination method or the like.

An example of a method for producing polymer film 10A include, for example, sequentially applying using a spin coating method and curing a polymer for a core (which will act as a core layer) and a polymer for cladding (which will act as upper cladding layer 16) on a polymer film for cladding (which is lower cladding layer 12). Another example of a method for producing polymer film 10A include applying a polymer for cladding on both surfaces of a polymer film for a core by, for example, a dipping method, and curing the polymer for cladding.

Still another example of a method for forming polymer film 10A include supplying an uncured polymer for a core to a space between two polymer film sheets for cladding such that the uncured polymer for a core is sandwiched between the two polymer film sheets, adjusting the thickness of the uncured polymer for a core to a desired thickness, and curing the polymer for a core.

Each of the material for the core and the material for the cladding of optical waveguide 10 according to the exemplary embodiment is not particularly limited as long as the material is transparent at a wavelength used for optical waveguide 10 and provides a desired difference in refractive index between the core and the cladding Examples thereof include an alicyclic olefin resin, an acrylic resin, an epoxy resin, and a polyimide resin.

In order to impart optical characteristics as an optical waveguide in which light propagates through cores 20, cladding portions 12, 16, and 18 enclosing cores 20 are formed by a material that has a lower refractive index than that of cores 20. In particular, in order to ensure that there is a difference in refractive index between the cladding and optical waveguide cores 20, the relative index difference between the core (cores 20) and the cladding (cladding portions 12, 16, and 18) may be 0.5% or more or about 0.5% or more, and preferably 1% or more or about 1% or more. The relative index difference as used herein is defined by the following equation: $(n1-n2)/n2 \times 100 [\%]$, wherein n1 represents a refractive index of a core and n2 represents a refractive index of a cladding portion. From the viewpoint of efficiently confining light, the difference in refractive index among cladding portions 12, 16, and 18 is preferably smaller, and may be 0.05 or less, and preferably 0.001 or less still more preferably, there is no difference in refractive index among cladding portions 12, 16, and 18.

Figure 3B:
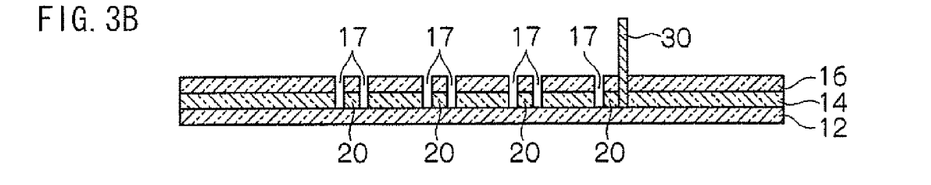

As shown in FIG. 3B, polymer film 10A is then cut with dicing saw 30 in the thickness direction from the upper cladding layer 16 side through at least upper cladding layer 16 and core layer 14, so that groove portions 17 for forming core portions 20 (i.e., for separating core portions 20 from each other or from other parts of core layer 14) are formed. Plural groove portions (cut grooves) 17 are formed by the cutting, and a portion of core layer 14 flanked by two groove portions 17 that are disposed at a certain distance from each other will serve as a core 20 through which light propagates. Therefore, for example, when three or more groove portions 17 are formed, plural core portions 20 are formed such that the plural core portions are arranged parallel to each other in the width direction of polymer film 10A and such that the plural core portions are in the same plane on lower cladding layer 12. When lower cladding layer 12 is also partially cut in the thickness direction in addition to the cutting through upper cladding layer 16 and core layer 14, core portions 20 are surely formed. At the time of cutting, the cutting height from the bottom surface of polymer film 10A (i.e. the distance between the bottom surface of polymer film 10A and the bottom of the cut grooves) may be adjusted such that dicing saw 30 does not penetrate through polymer film 10A.

Figure 3C:
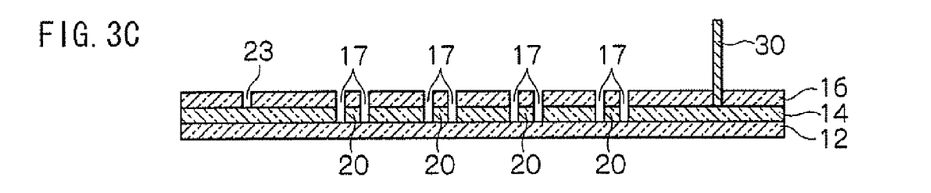

As shown in FIG. 3C, groove portions 23, at which position recognition marks will be provided, are then formed at regions different from the core forming regions of optical waveguide 10, by cutting polymer film 10A with dicing saw 30 in the thickness direction from the upper cladding layer 16 side; optical waveguide 10 may be cut to a depth that is at least a part of the thickness of upper cladding layer 16. Groove portions 23 for position recognition marking may be formed at positions that do not overlap core portions 20 when viewed from a direction perpendicular to a principal surface of polymer film 10A, and the formation of groove portions 23 may be conducted by cutting only upper cladding layer 16 (the cutting depth may be the entire thickness of upper cladding layer 16 or a part of the thickness of upper cladding layer 16), or cutting upper cladding layer 16 and core layer 14 (the cutting depth may be {the entire thickness of upper cladding layer 16+the entire thickness or a part of the thickness of core layer 14}), or cutting upper cladding layer 16, core layer 14, and a part of lower cladding layer 12 (the cutting depth may be {the entire thickness of upper cladding layer 16+the entire thickness of core layer 14+a part of the thickness of lower cladding layer 12}). For example, when cutting for forming groove portions 23 is performed parallel to groove portions 17 for forming core portions directly after the formation of groove portions 17 for forming core portions, groove portions 23 for position recognition marking is easily formed, and the location of core portions 20 can be easily identified after colored resin 24 is filled into groove portions 23 for position recognition marking.

Further, the thickness of colored resin layer 24 may be 10 μm or more in order for colored resin 24, which is to be filled into groove portions (cut grooves) 23 for position recognition marking, to function as position recognition marks afterwards (i.e., in order to obtain a contrast capable of image recognition). Therefore, the depth (height) of groove portions 23 for position recognition marking may be 10 μm or more or about 10 μm or more.

In contrast, the width of each groove portion 23 for position recognition marking is not particularly limited as long as the width does not influence core portions 20. Since the width of a groove formed by a single cutting operation by dicing saw 30 is usually from 20 μm to 300 μm, the width of each groove portion 23 for position recognition marking may be within this range.

The accuracy of positioning dicing saw 30 is 5 μm or less. Therefore, grooves can be formed with high positional accuracy unless a material to be processed (polymer film 10A) is not detached from the workbench of dicing saw 30. Accordingly, the order of the step of forming groove portions 17 for core formation and the step of forming groove portions 23 for position recognition marking are not particularly limited, as long as a set-up operation between the steps that makes it difficult to secure the positional accuracy, such as detaching/attaching polymer film 10A from/to the workbench of dicing saw 30, is not included. For example, groove portions 23 for position recognition marking may be formed before the formation of groove portions 17 for forming core portions. It is also possible to perform a continuous processing within one cutting program, such as first forming at least one groove portion 23 for position recognition marking, and then forming groove portions 17 for core portion formation, and then forming at least one groove portion 23 for position recognition marking.

Figure 3D:
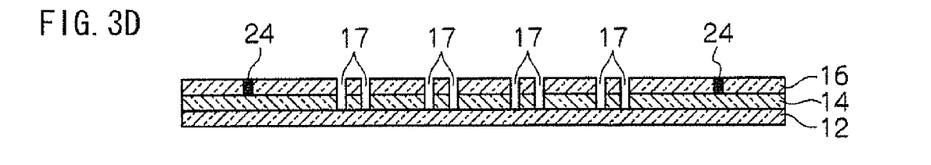

Then, as shown in FIG. 3D, colored resin 24 is filled into at least one of groove portions 23 for position recognition marking that have been formed in polymer film 10A in FIG. 3C.

Specifically, colored curable resin 24 is supplied into groove portions 23 for position recognition marking and is cured to form position recognition marks (position recognition lines). Since groove portions 23 for position recognition marking, into which colored resin 24 is to be filled, are not involved in the formation of core portions 20 and are separated from core portions 20, the kind and/or characteristics of colored resin 24 filled into groove portions 23 for position recognition marking do not affect the optical characteristics of optical waveguide 10. As described above, groove portions 23 for position recognition marking are formed with dicing saw 30 at positions other than the positions at which cores are to be formed from core layer 14, and colored resin 24 is filled into groove portions 23, so that image recognition is made possible.

The material of colored resin 24 may be, for example, a material which has a color capable of being recognized by an automatic device having an image recognition function and with which a sufficient adhesion strength to a resin that forms upper cladding layer 16 contacting colored resin 24 is obtained. The material of colored resin 24 may be, for example, an acrylic coating material or an epoxy coating material, and may be used without restrictions regardless of what kind of resin material is used for forming colored resin 24 and/or what method is used for coloration. For example, colored resin layer 24 having sufficient adhesion strength may be obtained if the material thereof is a material obtained by adding a dye and/or pigment assuming a desired color to the resin used for forming upper cladding layer 16.

The width of each groove portion 23 formed by using dicing saw 30 is usually from 20 μm to 300 μm as described above, and the viscosity of the colored resin before curing is not limited as long as the colored resin can be filled into groove portions 23 having such a width.

The method for filling colored resin 24 into groove portions 23 is not particularly limited as long as colored resin 24 can fill groove portions 23 in conformity with the shape of groove portions 23. Examples thereof include: a method including applying a colored resin to groove portions 23 and removing excess colored resin with a squeegee or the like; and a method including closely attaching a silicone rubber plate onto upper cladding layer 16 and filling a colored resin into the spaces corresponding to groove portions 23 by capillary action. The filling method using a squeegee is effective when a colored resin having high viscosity before curing is used, and the filling method using capillary action is effective when a colored resin having low viscosity before curing is used.

Figure 3E:
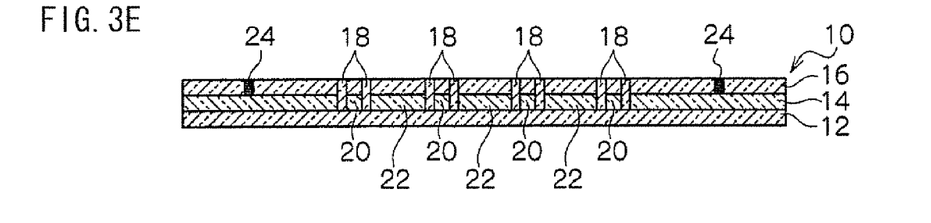

Then, as shown in FIG. 3E, each of groove portions 17 for forming core portions are filled with a cladding material to form embedded cladding portions (third cladding) 18. For example, a curable resin for forming a cladding layer is filled into groove portions 17 for forming core portions in polymer film 10A, and the resin is cured to form embedded cladding portions 18, The curable resin for forming embedded cladding portions 18 is a liquid material, and examples thereof include a radiation-curable resin, an electron-beam curable resin, and a thermosetting resin. Among them, a UV-curable resin and a thermosetting resin are preferable, and it is more preferable to select a UV-curable resin. Examples of the UV-curable or thermosetting resin include a UV-curable or thermosetting monomer, a UV-curable or thermosetting, oligomer, and a mixture of the monomer and the oligomer. Examples of the UV-curable resin include an epoxy UV-curable resin, a polyimide UV-curable resin, and an acrylic UV-curable resin.

Through the above-described steps, optical waveguide 10 having position recognition marks 24 as shown in FIGS. 1 and 2 is produced. Depending on the distance between groove portions 17 for forming core portions (the distance between embedded cladding portions), core layer (dummy cores) 22 that is not used as cores 20 is formed in optical waveguide 10, as shown in FIGS. 1 and 3E.

Although core portions 20 and cladding portions 12, 16, and 18 have different refractive indices, they are each transparent to visible light. Therefore, it is difficult to identify the positions of the cores by image recognition based on an image of optical waveguide 10 taken by an image-pickup device. Therefore, without position recognition marks 24 colored by a colored resin, it has been difficult to use automatic machines performing high-precision alignment by image recognition in a step of forming the outer shape of the optical waveguide with high precision in which the waveguide is formed into the shape of a component for self-alignment after the production of the optical waveguide structure, or a step of mounting optical elements by passive alignment. In contrast, the positions of position recognition marks 24 colored by the colored resin are easily identified by image-pickup. Groove portions 17 for forming cores 20 and groove portions 23 for forming position recognition marks are each formed to have an accurate positional relationship with cores 20 based on the processing accuracy of dicing saw 30.

Figure 4:
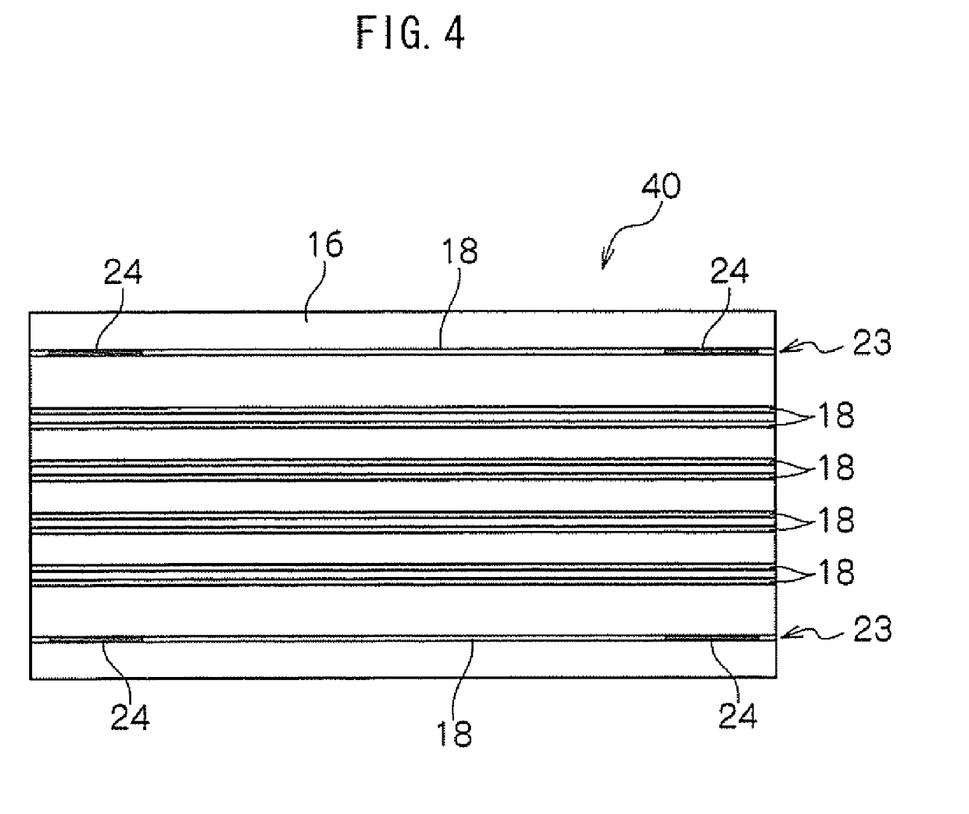
FIG. 4 is a plan view showing another example of a position recognition mark.

Colored resin 24 may fill only portions required for alignment by image recognition. For example, as shown in FIG. 4, colored resin 24 may fill only a part of each groove 23. When colored resin 24 fills only a part of each groove portion 23 for position recognition marking in the step of FIG. 3D, the other part thereof not filled with colored resin 24 may be filled with resin 18 for the embedded cladding portion in the step illustrated in FIG. 3E.

Figure 5A:
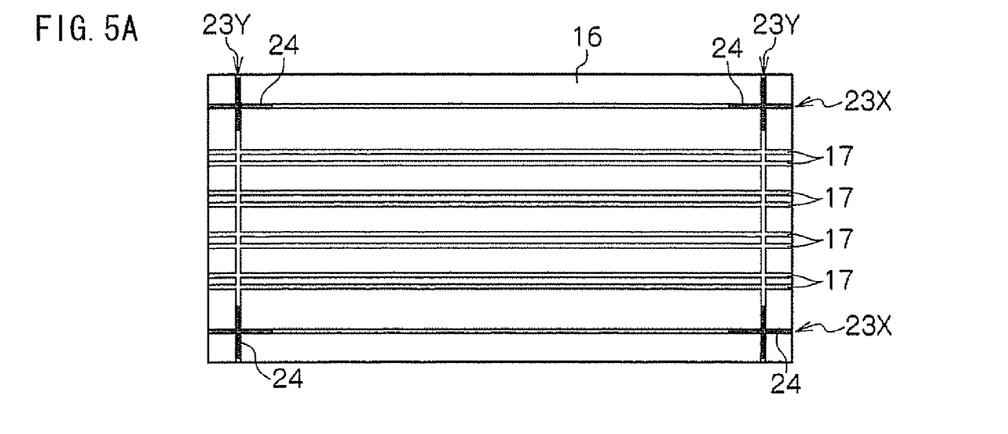
FIGS. 5A to 5C are plan views showing further examples of position recognition marks.

When plural groove portions (cut grooves) for position recognition marking are formed to intersect each other, a two-dimensional position can be indicated. FIG. 5A shows an example of position recognition marks 24 provided at groove portions 23X and groove portions 23Y that intersect substantially at right angles. In order to form groove portions 23Y which intersect with core portions 20 when viewed from a principal surface of optical waveguide 10 as shown in FIG. 5A, cutting may be conducted only in upper cladding layer 16 to form groove portions 23Y.

Figure 5B:
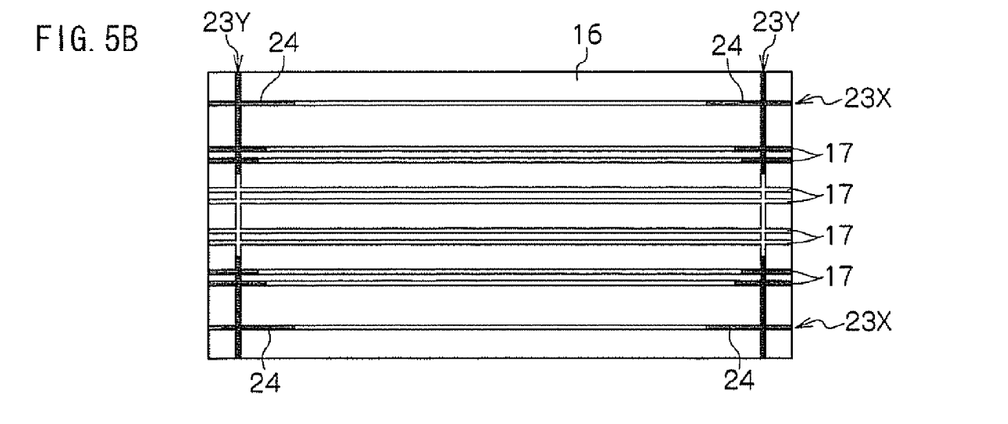

When colored resin 24 is filled into groove portions 23X and 23Y for position recognition marking as shown in FIG. 5A, there is a possibility that colored resin 24 may flow into groove portions 17 for forming core portions through capillary action as shown in FIG. 5B and may cause optical loss in the optical waveguide. For example, when the distance from an intersection of groove portion 23X with groove portion 23Y to groove portion 17 for core formation is large, although the flow of colored resin 24 into groove portions 17 for core formation shown in FIG. 5B is suppressed, the use efficiency of the material (optical waveguide) may be reduced.

Figure 5C:
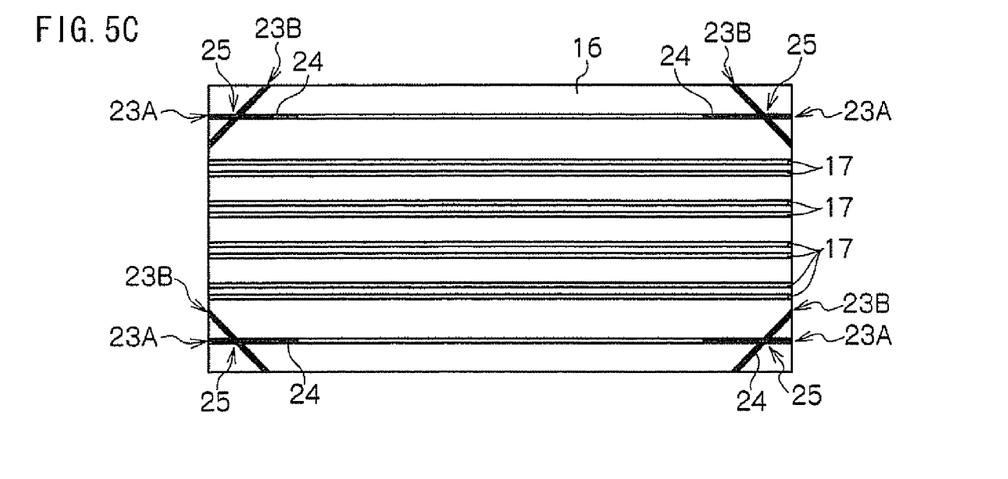
Figure 6:
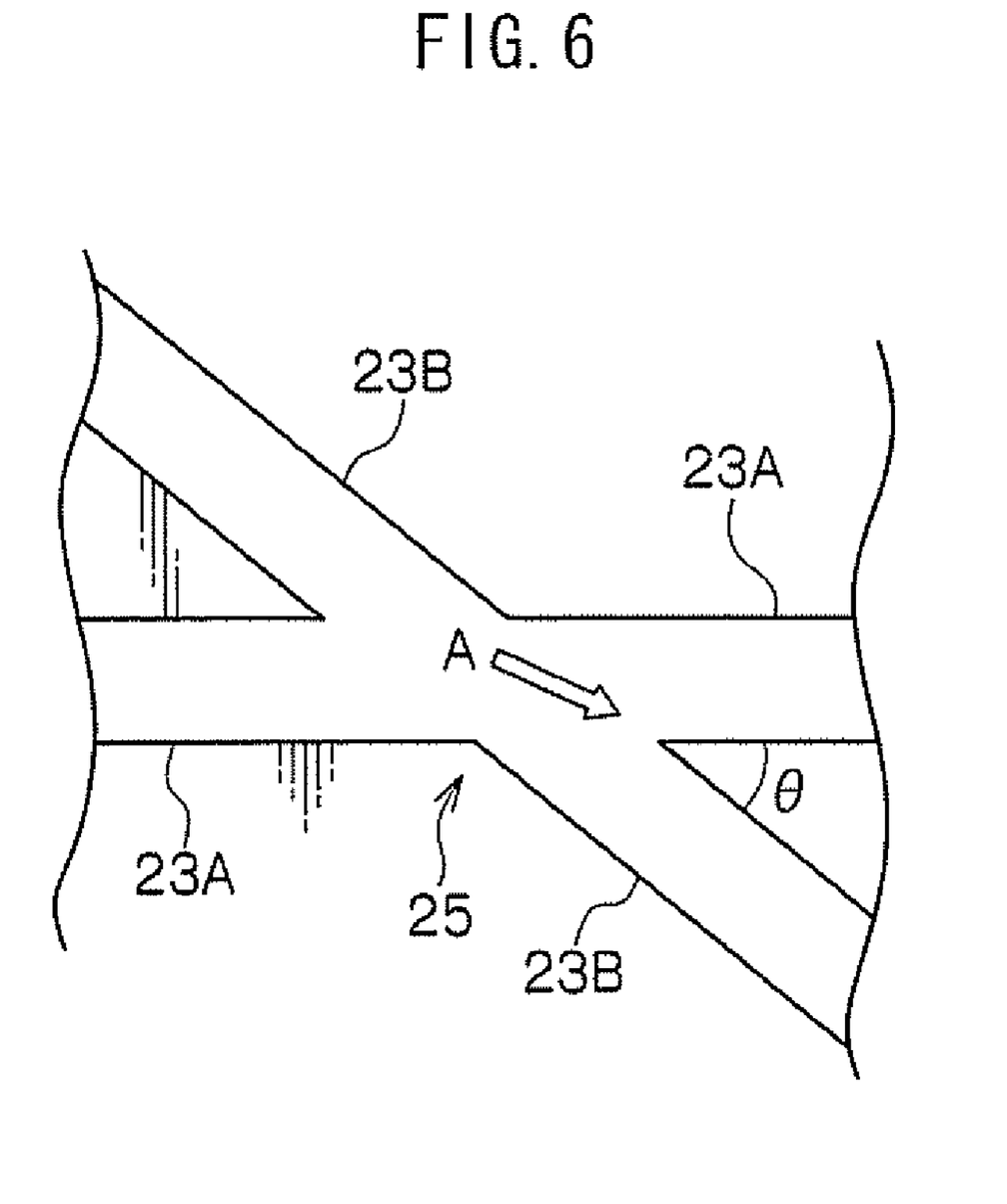
FIG. 6 is a view showing an angle at an intersection of groove portions.

Therefore, as shown in FIGS. 5C and 6, first groove portions 23A and second groove portions 23B are formed. When viewed from a direction perpendicular to a principal surface of the optical waveguide, first groove portions 23A are parallel to core portions 20, second groove portions 23B intersect with first groove portions 23A, and second groove portions 23B do not intersect with groove portions 17 for forming core portions 20. Colored resin 24 for position recognition marking is embedded at portions (intersections) 25 at which first groove portions 23A intersect with second groove portions 23B Two-dimensional position recognition within the optical waveguide is made possible by the formation of position recognition marks 24 at intersections of groove portions 23A, which are parallel to core portions 20, with groove portions 23B, which intersect with groove portions 23A at an oblique angle. Since neither of groove portions 23A nor 23B intersects or overlaps with groove portions 17 for forming cores (core portions 20), colored resin 24 provided at intersections 25 does not flow into groove portions 17, so that an increase in optical loss of the optical waveguide due to blemishes around the core caused by colored resin 24 is prevented. Further, since second groove portions 23B do not overlap core portions 20, the depth of groove portions 23B is not limited to less than the thickness of upper cladding layer 16, and the thickness of upper cladding layer 16 and/or the depth of groove portions 23B can be freely selected.

Figure 7:
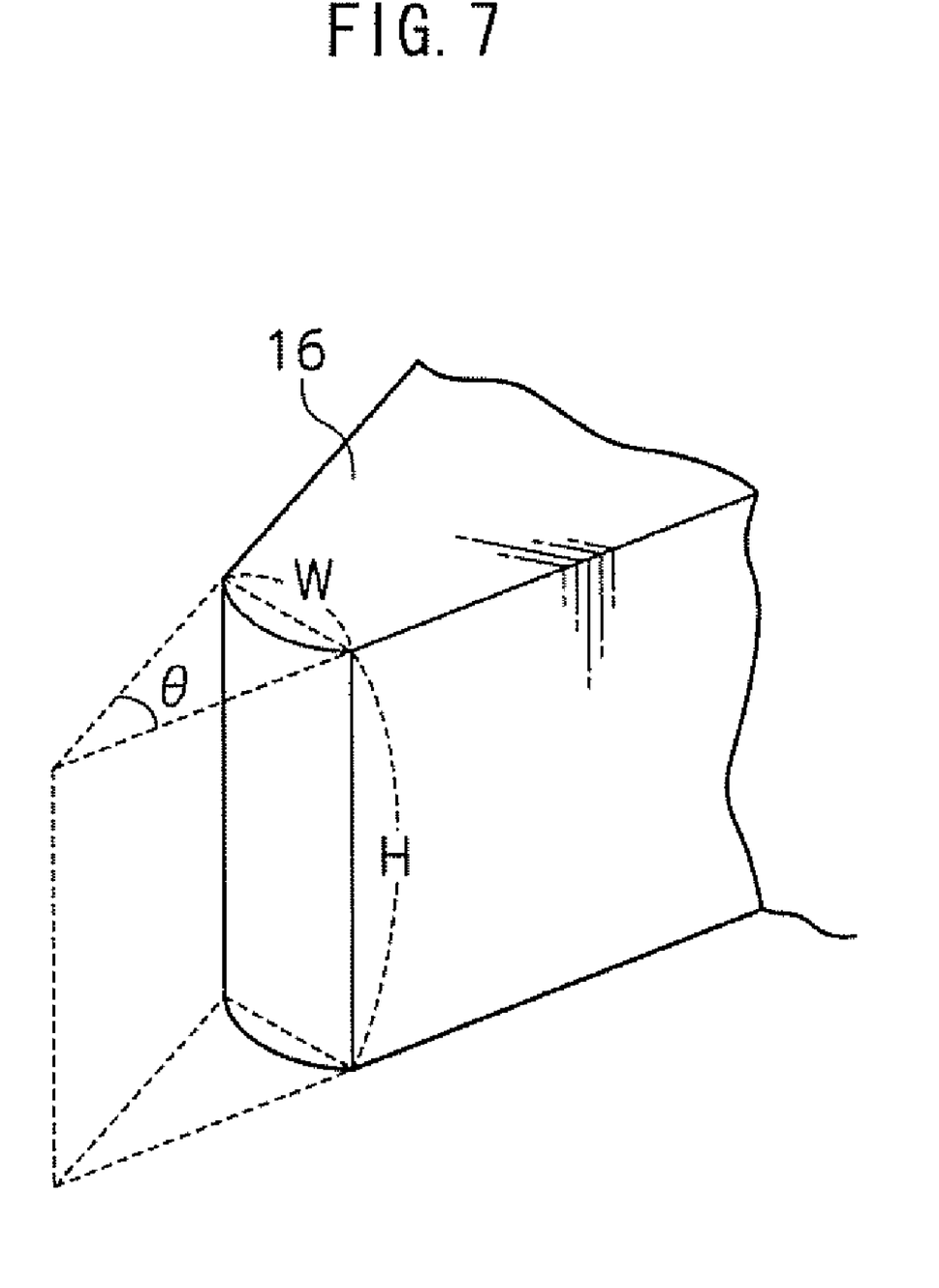
FIG. 7 is a view schematically showing a columnar structure left after cutting at the intersection of the groove portions.

However, when a dicing saw is used to form groove portions 23A and 23B for position recognition marking as described above, the contour of a portion (intersection) at which groove 23A intersects with groove 23B may fail to maintain its shape and may lose its shape. Such a loss of contour shape at the intersection of groove portion 23A with groove portions 23B is likely to be affected by the angle at which groove portion 23A intersects with groove portion 23B. FIG. 6 indicates an angle θ at which first groove portion 23A intersects with second groove portion 23B, and FIG. 7 schematically illustrates upper cladding layer 16 viewed from the direction indicated by arrow A shown in FIG. 6. A columnar structure shown in FIG. 7 is left at intersection 25 of groove 23A with groove 23B as a result of cutting. When the ratio of the height H of the columnar structure to the width W of the columnar structure (height/width) is higher, it is more likely that the contour shape is lost. When groove 23A and groove 23B are formed with a dicing saw, the contour shape is unlikely to be lost and the grooves can be formed stably if the ratio of height H to width W (height/width) of the columnar structure left after cutting is lower than 10. For example, when the cutting depth is 20 μm or more with which sufficient coloring is possible, and a loss of shape up to about 5 μm (this scale corresponding to the alignment accuracy required for aligning a multimode optical waveguide), are assumed to be permissible, angle θ at which first groove portion 23A intersects with second groove portion 23B may be at least 20 decrees or at least about 20 degrees.

However, when angle θ at which first groove portion 23A intersects with second groove portion 23B is larger, the area of the optical waveguide film used for forming position recognition mark 24 becomes greater in order to avoid overlapping with core portion 20, whereby the use efficiency of the material (optical waveguide) is lowered. Therefore, angle θ at which first groove portion 23A intersects with second groove portion 23B may be 80 degrees or less. If angle θ at which first groove portion 23A intersects with second groove portion 23B is 80 degrees or less, for example when a position recognition mark is formed at a position that is 1 mm inside an end portion of the optical waveguide in the light propagating direction, the required additional width, which is the width of the region not participating in the core formation in the width direction of the optical waveguide, may be 6 mm or less. In contrast, when angle θ at which groove portion 23A intersects with groove portion 23B is more than 80 degrees, for example 85 degrees, the distance between intersection 25 of groove portion 23A with groove portion 23B and core 20 is 10 mm or more when viewed from a direction perpendicular to a principal surface. When the distance is 10 mm or more, the use efficiency of the material (optical waveguide) is lowered although flow of colored resin 24 into groove 17 is suppressed even when groove 23B overlaps core 20. Accordingly, angle θ at which first groove portion 23A intersects with second groove portion 23B is preferably from 20 degrees to 80 degrees or from about 20 degrees to about 80 degrees.

By setting angle θ at which groove 23A intersects with groove 23B such that angle θ falls within the above range, reduction in the use efficiency of the material is suppressed, formation of position recognition mark 24 that maintains an intact shape is facilitated, and high-precision two-dimensional position recognition within the optical waveguide becomes possible.

EXAMPLES

In the following, examples are described. However, the examples should not be construed as limiting the invention.

Example 1

The following materials are prepared:
Acrylic UV-curable resin as a resin for a core, which will have a refractive index of 1.57 after curing;
Acrylic UV-curable resin as a resin for cladding, which will have a refractive index of 1.51 after curing; and
ARTON film with a thickness of 100 μm as a film for cladding (having a refractive index of 1.51; manufactured by JSR Corporation)

The resin for a core is sandwiched between two sheets of the ARTON film such that the total thickness is adjusted to 250 μm. The resin for a core is cured by irradiation with UV rays, so that a polymer film (three-layered film) having a three-layered structure and having a width of 30 mm and a length of 110 mm is obtained.

A dicing saw (DFD6361 (tradename) manufactured by Disco Corporation) equipped with a dicing blade having a blade thickness of 0.12 mm is prepared. When the dicing saw is used to cut an ARTON film, the width of the formed groove portion is 0.125 mm.

The three-layered film is placed at a center of the workbench of the dicing saw with a dicing tape interposed therebetween, such that the cutting direction of the dicing saw is parallel to the longitudinal direction of the three-layered film.

Using the dicing saw, groove portions for forming core portions are formed along the longitudinal direction of the three-layered film at a central (with respect to the width direction) portion of the three-layered film. Specifically, the cutting height is set to be 80 μm above the bottom surface of the three-layered film, the first cutting is performed 7.5 mm before the center of the workbench of the dicing saw (therefore, the first cutting straight line is 7.5 mm distant from the centre of the workbench), the cutting position is shifted by (i) 0.175 mm if the number of cutting operations that have been performed is an odd number or (ii) 0.075 mm if the number of cutting operations that have been performed is an even number, and the cutting operation is performed 120 times, wherein the shifting of the cutting position is in the direction from the first cutting line to the center of the workbench.

Then, the cutting height is changed to 200 μm above the bottom surface of the three-layered film, one cutting groove (groove portion) is formed 12 mm before the center of the workbench of the dicing saw, and one cutting groove (groove portion) is formed 12 mm behind the center of the workbench.

Then, the workbench of the dicing saw is rotated 45 degrees in the clockwise direction, cutting is performed at 53 mm before and 53 mm behind the center of the workbench at a cutting height of 200 μm above the bottom surface of the three-layered film.

Then, the workbench of the dicing saw is rotated 90 degrees in the counterclockwise direction, cutting is performed at 53 mm before and 53 mm behind the center of the workbench at a cutting height of 200 μm above the bottom surface of the three-layered film. Thus, intersections of groove portions, each of which has a depth (cutting height) of 200 μm, are formed.

Then, a red resin prepared by mixing and dispersing ultrafine particles of a red azo pigment into the acrylic UV-curable resin for cladding is applied dropwise onto the intersections of groove portions formed in the above process. Thereafter, excess red resin is removed with a spatula formed of TEFLON (registered trademark), and the applied resin is cured by UV irradiation.

Then, the acrylic UV-curable resin for cladding is applied to the three-layered film, and is cured by UV irradiation.

Finally, the external size is adjusted by using a dicing saw, such that the longest edges of the external shape are made parallel to the cores by reference to the positions of the position recognition marks. As a result, an optical waveguide having position recognition marks is obtained which has a length of 105 mm and a width of 25 mm and in which 60 cores each having a width of 50 μm are arranged at a pitch of 250 μm.

A Si base substrate having a length of 90 mm and a width of 30 mm is cut out from a Si wafer having a thickness of 0.4 mm. A test is made to connect, on the Si base substrate, an end surface (in the longitudinal direction) of one piece of the optical waveguide obtained above to an end surface (in the longitudinal direction) of another piece of the optical waveguide. The placement of the optical waveguide pieces on the Si base substrate is conducted by reference to the position recognition marks of the optical waveguide pieces, using a high-precision bonder having a positioning accuracy of ±1 μm when measured without load.

The optical loss of the optical waveguide is measured when LED light having a wavelength of 850 nm is introduced through a grated-index optical fiber having a core diameter of 50 μm into the optical waveguide pieces from one end of the connected optical waveguide pieces. The excess loss at the connection portion of the optical waveguide pieces is 0.5 dB in terms of the average of the values at the respective channels, so that it is confirmed that excellent alignment has been achieved by reference to the position recognition marks.

The present invention is not limited to the exemplary embodiments and examples described above, and may be modified appropriately. For example, the number of grooves for forming cores, the number of grooves for position recognition marking, and the like are not limited, and may be adjusted in accordance with the requests. Further, an optical waveguide having a structure in which plural cores are arranged in the thickness direction of the optical waveguide is also included in the scope of the present invention.

What is claimed is:

1. An optical waveguide comprising:
    a core portion through which light propagates;
    a cladding portion enclosing the core portion along a direction of light propagation;
    a first groove portion substantially parallel to the core portion and a second groove portion intersecting with the first groove portion but not substantially overlapping the core portion; and
    a colored resin for position recognition marking,
    the optical waveguide having substantially planar outer surfaces including principal surfaces thereof,
    the colored resin being embedded in the optical waveguide at a position in the thickness direction other than a position in the thickness direction of the core portion and at a position that does not substantially overlap the core portion when viewed from a direction perpendicular to a principal surface of the optical waveguide and does not substantially contact the core portion, and
    the colored resin for position recognition marking being present in the first groove portion and the second groove portion in at least a portion at which the first groove portion intersects with the second groove portion.

2. The optical waveguide according to claim 1, wherein the colored resin for position recognition marking is embedded substantially in parallel with the core portion.

3. The optical waveguide according to claim 1, wherein the first groove portion and the second groove portion intersect at an angle of from about 20 degrees to about 80 degrees.

4. The optical waveguide according to claim 1, wherein the relative index difference between the core portion and the cladding portion is about 0.5% or more.

5. The optical waveguide according to claim 1, wherein the depth of each of the first groove portion and the second groove portion is about 10 μm or more.

6. A method of producing an optical waveguide, comprising:
    preparing a layered material in which at least a layer of a first cladding, a core layer, and a layer of a second cladding are provided in this order;
    cutting at least the second cladding layer and the core layer in the thickness direction from the second cladding layer side of the layered material, so as to form a groove portion A for forming a core portion through which light propagates;
    cutting the layered material in the thickness direction from the second cladding layer side to a depth that is at least a part of the thickness of the second cladding layer, so as to form a groove portion B at which a position recognition mark is to be formed;
    supplying a colored resin to at least a part of the groove portion B; and
    supplying a cladding material to the groove portion A,
    the forming of the groove portion B includes forming a first groove portion that is parallel to the core portion and a second groove portion that intersects with the first groove portion but does not intersect with the groove portion A, and
    the supplying of the colored resin to the at least a part of the groove portion B includes supplying the colored resin to at least a portion at which the first groove portion intersects with the second groove portion.

7. The method according to claim 6, wherein the groove portion B is formed substantially in parallel with the groove portion A.

8. The method according to claim 6, wherein the first groove portion and the second groove portion intersect at an angle of from about 20 degrees to about 80 degrees.

9. The method according to claim 8, wherein the cutting is performed with a dicing saw.

* * * * *